(12) United States Patent
Humphrey et al.

(10) Patent No.: US 9,708,438 B2
(45) Date of Patent: *Jul. 18, 2017

(54) THERMOPLASTIC POLYURETHANE COPOLYMER MOLDING COMPOSITIONS

(75) Inventors: William M. Humphrey, Dover, NH (US); Paul Drago, Rochester, NH (US); Jeffrey S. Armour, Great Falls, VA (US); Jim E. Ingram, Carpentersville, IL (US); James R. Charron, Pittsburgh, PA (US)

(73) Assignee: Covestro LLC, Pittsburgh, PA (US)

( * ) Notice: Subject to any disclaimer, the term of this patent is extended or adjusted under 35 U.S.C. 154(b) by 409 days.

This patent is subject to a terminal disclaimer.

(21) Appl. No.: 12/672,174

(22) PCT Filed: Aug. 8, 2008

(86) PCT No.: PCT/US2008/009519
§ 371 (c)(1),
(2), (4) Date: Feb. 15, 2011

(87) PCT Pub. No.: WO2009/023131
PCT Pub. Date: Feb. 19, 2009

(65) Prior Publication Data
US 2011/0177344 A1    Jul. 21, 2011

(51) Int. Cl.
| | |
|---|---|
| *C08L 75/08* | (2006.01) |
| *C08G 18/48* | (2006.01) |
| *C08G 18/32* | (2006.01) |
| *C08G 18/66* | (2006.01) |
| *C08G 18/75* | (2006.01) |
| *C08L 75/04* | (2006.01) |
| *C08L 33/06* | (2006.01) |
| *C08L 53/00* | (2006.01) |

(52) U.S. Cl.
CPC ..... *C08G 18/4866* (2013.01); *C08G 18/3206* (2013.01); *C08G 18/3234* (2013.01); *C08G 18/6674* (2013.01); *C08G 18/758* (2013.01); *C08L 75/04* (2013.01); *C08G 2140/00* (2013.01); *C08L 33/064* (2013.01); *C08L 53/00* (2013.01); *C08L 75/08* (2013.01); *C08L 2205/03* (2013.01); *Y10T 428/31554* (2015.04)

(58) Field of Classification Search
None
See application file for complete search history.

(56) References Cited

U.S. PATENT DOCUMENTS

| | | |
|---|---|---|
| 4,883,837 A | 11/1989 | Zabrocki |
| 5,096,993 A | 3/1992 | Smith et al. |
| 5,185,420 A | 2/1993 | Smith et al. |
| 5,605,961 A | 2/1997 | Lee et al. |
| 5,623,019 A | 4/1997 | Wiggins et al. |
| 5,708,118 A | 1/1998 | Seneker et al. |
| 5,824,738 A | 10/1998 | Humphrey et al. |
| 5,852,118 A | 12/1998 | Horrion et al. |
| 6,054,533 A | 4/2000 | Farkas et al. |
| 6,174,959 B1 | 1/2001 | Ciebien et al. |
| 6,187,859 B1 | 2/2001 | Humphrey et al. |
| 6,365,674 B1 | 4/2002 | Kaufhold et al. |
| 6,414,081 B1 | 7/2002 | Ouhadi |
| 6,469,099 B1 | 10/2002 | Farah et al. |
| 2003/0216507 A1* | 11/2003 | Masubuchi ............... 525/66 |
| 2004/0170788 A1 | 9/2004 | MacDonald et al. |

FOREIGN PATENT DOCUMENTS

| | | |
|---|---|---|
| EP | 0569746 A1 | 11/1993 |
| EP | 1362893 A1 | 11/2003 |
| EP | 1235879 B1 | 5/2004 |

OTHER PUBLICATIONS

Mavridis, H. and Shroff, R. N., "Temperature dependence of polyolefin melt rheology", Polymer Engineering & Science 1992, 32(23), 1778-1791.*
"External, adj. and n.". OED Online. Mar. 2013. Oxford University Press. Retrieved Apr. 20, 2013.*
"Comprise, v." OED Online. Oxford University Press. Accessed from http://www.oed.com/view/Entry/37893 on Oct. 18, 2016.*
"Comprise." Merriam-Webster. Accessed from http://www.merriam-webster.com/dictionary/comprise on Oct. 18, 2016.*

* cited by examiner

*Primary Examiner* — Richard A Huhn
(74) *Attorney, Agent, or Firm* — Robert S. Klemz; Donald R. Palladino; Richard P. Bender

(57) ABSTRACT

Compositions for forming molded articles, particularly, shells for automotive applications are made up of melt blends of aliphatic thermoplastic urethane elastomer and an olefin-containing block copolymer crosslinked to a gel content of from 5 to 95%. These compositions may be blended to form a powder, pellets, microspheres or minibeads which may then be cast to form air bag door and instrument panel cover skins which may meet automotive deployment and weathering requirements.

26 Claims, No Drawings

THERMOPLASTIC POLYURETHANE COPOLYMER MOLDING COMPOSITIONS

FIELD OF THE INVENTION

This invention relates to compositions which are blends of (a) at least one thermoplastic polyurethane and (b) an olefin-containing block copolymer crosslinked to a gel content of from about 5 to about 95%. These blends are suitable for molding, particularly suitable for slush molding to form a shell having improved feel. The shell also maintains good weathering and air bag deployment properties.

BACKGROUND OF THE INVENTION

The use of low unsaturation level polyols made from double metal cyanide catalysts in combination with chain extenders in the preparation of thermoplastic elastomers is known. Compositions made with such polyols are disclosed, for example, in U.S. Pat. Nos. 5,096,993 and 5,185,420.

Prior to the use of double metal cyanide catalysts for the preparation of high molecular weight polyols, the thermoplastic polyurethane elastomers produced with polyoxyalkylene polyols had poor physical properties, such as being too hard, due to high levels of terminal unsaturation in the polyols used in their production. The thermoplastic polyurethane elastomers disclosed in U.S. Pat. Nos. 5,096,993 and 5,185,420 are thermoplastic elastomers made with polyols having less than 0.04 meq/g of end group unsaturation. These thermoplastic elastomers are taught to have enhanced softness.

Because of their softness, thermoplastic elastomers are frequently used in the construction of automotive interior trim components. Automotive manufacturers frequently specify that the elastomers used to produce interior trim components must have adequate long-term stability and resistance to degradation by ultraviolet light and that the elastomers must also meet specific manufacturing specifications for resistance to ultraviolet light exposure, particularly in the case of instrument panels.

In order to achieve manufacturing specifications for resistance to ultraviolet exposure, antioxidants, ultraviolet light stabilizing agent(s), and pigment(s) may be added to elastomers.

Additionally, due to the presence of end group unsaturation of previously available polyols with molecular weights greater than 2,000, soft (low durometer) aliphatic thermoplastic urethane elastomers have not been available in a dry castable powder or particle forms.

U.S. Pat. Nos. 5,824,738 and 6,187,859 disclose aliphatic urethane elastomer compositions comprising low end group unsaturation, low molecular weight polyols stabilized with one or more ultraviolet stabilizing agents, an antioxidant and pigments. While the performance of such elastomers has been outstanding, the relatively high cost of these elastomers due to their use of aliphatic isocyanates has limited their commercial desirability.

One approach taken to reduce the cost of these aliphatic urethane elastomer compositions is to blend the aliphatic thermoplastic polyurethane with a less expensive polymeric material. However, such blends tend to separate, under production conditions. Such separation adversely affects the physical properties of the final product.

U.S. Pat. No. 4,883,837 discloses one technique for producing compatible blends of polyolefins with thermoplastic polyurethanes. In the blends disclosed in U.S. Pat. No. 4,883,837, a modified polyolefin is also included in the blended composition. The blends taught in U.S. Pat. No. 4,883,837 are made up of from 15 to 60 wt. % of polyolefin, from 30 to 70 wt. % thermoplastic polyurethane and from 10 to 35 wt. % modified polyolefin. It is the modified polyolefin which acts a compatibilizing agent for the polyolefin and thermoplastic polyurethane.

U.S. Pat. No. 5,109,050 discloses a composition made up of from 80-99 parts by weight of a thermoplastic polyurethane resin and from 1 to 20 parts by weight of a modified polyolefin resin. Any of the known thermoplastic polyurethane resins may be used in the compositions of U.S. Pat. No. 5,109,050. Any of the known modified polyolefin resins may be used in the compositions of U.S. Pat. No. 5,109,050. The compositions described in U.S. Pat. No. 5,109,050 are taught to be flexible, smooth to the touch and stretchable. It is these properties which are said to make these compositions particularly useful for producing diapers.

U.S. Pat. No. 5,852,118 discloses block copolymers of chemically modified polyolefins with thermoplastic polyurethanes, copolyesters or copolyamides and a coupling agent. The coupling agent is a diisocyanate with blocked or unblocked polyisocyanates. This diisocyanate coupling agent may be used in combination with a co-coupling agent selected from primary amines, secondary amines, diols, diepoxides, amino/hydroxy and amino/epoxy compounds. These block copolymers are useful as compatibilizing blends of polar and non-polar thermoplastic elastomers and for promoting adhesion of thermoplastic elastomers onto various polar engineering resins.

U.S. Pat. No. 5,605,961 discloses homogeneous thermoplastic compositions which include (1) a polyolefin selected from isotactic polypropylene, syndiotactic polypropylene and a blend of isotactic polypropylene and thermoplastic polyurethane and (2) a mixture of from 1 to 99% thermoplastic polyurethane and from 1 to 99% of the reaction product of a modified polyolefin and a polyamide resin.

U.S. Pat. No. 5,623,019 discloses a compatibilized thermoplastic molding composition made up of from 30 to 90% thermoplastic polyurethane, 10 to 70% of a polyolefin having a number average molecular weight of at least 10,000 and a compatibilizing agent which is a copolymer having a number average molecular weight of from 25,000 to 350,000 and containing blocks of monoalkylene arene and either hydrogenated conjugated diene or non-hydrogenated conjugated diene.

U.S. Pat. No. 6,054,533 discloses compatibilized blends of a thermoplastic elastomer and a polyolefin in which the compatibilizing agent is a thermoplastic polyurethane. This thermoplastic polyurethane compatibilizing agent is the reaction product of a substantially hydrocarbon, intermediate, a diisocyanate and an amine or diol chain extender. The thermoplastic polyurethane compatibilizing agent is included in an amount of from 0.25 to 15 parts by weight for every 100 parts by weight of thermoplastic elastomer plus polyolefin.

U.S. Pat. No. 6,174,959 discloses compatible blends of from 50 to 99% of an aliphatic thermoplastic polyurethane with from 1 to 50% of a copolymer composed of units derived from ethylene and propylene with 25-35% by weight of the copolymer being derived from propylene units. The polyether polyols used to produce the thermoplastic polyurethanes required in U.S. Pat. No. 6,174,959 may have functionalities no greater than 6 and molecular weights of from 400 up to 20,000. There is no teaching in this disclosure with respect to the unsaturation level of the polyether polyols used to produce the thermoplastic polyurethanes used in these blends.

U.S. Pat. No. 6,235,830 discloses a polyurethane resin for slush molding composed of a thermoplastic polyurethane elastomer, a plasticizer and a compound containing a radical polymerizable unsaturated group. The plasticizer is included in an amount of from 5 to 50 parts by weight per 100 parts by weight of polyurethane elastomer. The compound containing a radical polymerizable unsaturated group is included in an amount of from 0.1 to 10 parts by weight per 100 parts by weight of polyurethane elastomer.

U.S. Pat. No. 6,365,674 discloses thermoplastic polyurethane resins which form compatible blends with polyolefins. The compatibility described therein is taught to be attributable to production of the thermoplastic polyurethane from a reaction mixture which includes a reactive polyolefin containing at least one hydroxyl, amine or carboxylic acid functional group.

U.S. Pat. No. 6,414,081 discloses compatibilized blends of non-polar thermoplastic elastomers and polar thermoplastic polymers such as thermoplastic polyurethanes in which from 1 to 40 parts by weight, based on 100 parts by weight of blend, is a compatibilizer. Suitable compatibilizers include: (1) the condensation reaction product of 10-90 wt % of functionalized polymer with 10-90 wt. % of polyamide or (2) a blend of 10-90 wt. % functionalized polymer with 10-90 wt. % polyamide or (3) a mixture of (1) and (2).

U.S. Pat. No. 6,469,099 and EP 1,235,879 B1 each disclose compatibilized resin blends which include a thermoplastic polyurethane, a succinimide-based compatibilizing agent containing pendant isocyanate-reactive groups or polyoxyalkylene groups corresponding to a specified structure. The compatibilizing agent is used in amounts ranging from 0.5 wt. % to 20 wt. %, depending upon the particular application for which the product resin will be used.

SUMMARY OF THE INVENTION

It is an object of the present invention to provide a thermoplastic polyurethane composition having a tensile strength less than 2800 psi which is more economical than commercially available aliphatic urethane elastomers but which can still be molded, preferably slush molded, to produce elastomers having properties comparable to those of currently available aliphatic urethane elastomers.

It is also an object of the present invention to provide a compatible blend of thermoplastic polyurethane and an olefin-containing block copolymer cross-linked to a gel content of from about 5 to 95% without the need for an added compatibilizing agent.

These and other objects which will be apparent to those skilled in the art are accomplished with the compatible blend of (1) an olefin-containing block copolymer crosslinked to a gel content of from about 5 to about 95%, including all values and increments therein, and (2) an aliphatic thermoplastic polyurethane composition which has been produced from a high molecular weight polyether polyol (Molecular weight =1000 to 10,000 Da) with an unsaturation level less than or equal to 0.04 meq/g. A key feature of this compatible blend is that no external compatibilizing agent is added to the blend.

DETAILED DESCRIPTION OF THE PRESENT INVENTION

The present invention provides a moldable composition, preferably a slush moldable composition, which is composed of a compatible blend of from 5 to 95 wt. %, based on total weight of moldable composition, preferably, from 45 to 90 wt. % of a light stable polyether polyol-based aliphatic thermoplastic urethane (TPU) elastomer and from 5 to 95 wt. %, based on total weight of moldable composition, preferably, from 5 to 45 wt. % of a modifier which is an olefin-containing block copolymer that has been crosslinked to a gel content of from about 5 to, about 95%, including all values and increments therein. Particularly preferred compositions further include up to 10% by weight, preferably, up to 5% by weight, most preferably, up to 2% by weight, of an ionomer.

The thermoplastic polyurethane elastomer may be the reaction product of (a) a relatively low unsaturation, low molecular weight polyol, (b) one or more chain extenders, (c) an aliphatic diisocyanate and (d) a urethane catalyst, and optionally, (e) an ultraviolet stabilizing agent, (f) an antioxidant and/or (g) pigment.

The thermoplastic polyurethane blends of the present invention produced with an olefin-containing block copolymer are characterized by an ability to maintain low temperature resistance (ductility to about $-30°$ C.) and also weatherability (DE<3.0 after 1993 kiloJoules/m$^2$). Olefin-containing block copolymers having a Tg value of about $-90°$ C. are particularly desirable for use in the practice of the present invention. The olefin-containing block copolymers used as modifiers in the present invention include those copolymers containing a —CH$_2$-type repeating unit structure having substituted alkylene functionality(ies), and blends of such copolymers which are cross-linked to a gel content of from about 5 to about 95%. The gel content of a copolymer is determined by dividing the weight of insoluble polymer by the total weight of the polymer and multiplying by 100.

Particularly preferred olefin-containing block copolymers having a gel content of from 5 to 95% are terpolymers, i.e., polymers made up of three different repeating units which may be present in block, random or an alternating configuration. The components of each of the repeating units may be alkylene groups that are may be substituted with additional hydrocarbon functionality.

The number average molecular weight of the olefin-containing block copolymer modifier employed in the present invention will generally be less than or equal to about 100,000, including all values and increments therein. Particularly preferred olefin-containing block copolymers may also be further characterized by their rheology. For example, these preferred polyolefin modifiers may be such that a shear viscosity of about 900 (MPa) at a shear rate of 250 sec drops to a shear viscosity of about 150 (MPa) at about 2100 sec.

Examples of commercially available olefin-containing block copolymers suitable for use in the compositions of the present invention include those copolymers designated APR 7410, APR 7411, APR 7422, APX 4621, ALX 7621, and ALX 7622 which are all available from Advanced Polymer Alloys, a division of Ferro Corporation.

A portion of the olefin-containing block copolymer and/or elastomer alloy may be replaced with an ionomer, such as the ethylene methacrylic acid copolymers in which part of the methacrylic acid is neutralized with a metal ion such as zinc or sodium, which is commercially available from DuPont under the name Surlyn®. Such an ionomer reduces surface porosity and improves weathering when higher levels of the polyolefin are used. The composition may be melt compounded and formed into pellets, powder, microspheres or minibeads for slush casting of skins or shells for automotive interior panels, particularly instrument panels.

As noted above, thermoplastic polyurethane alloy compositions within the scope of the present invention are capable of meeting automotive weathering requirements, for instance, exposure to 1993 kiloJoules/m$^2$ of Xenon arc artificial weathering with a delta E (color change) less than or equal to 3. Instrument panel skins molded from these thermoplastic polyurethane alloy compositions are expected to be capable of withstanding successful air bag deployments at −30° C. and 107° C. and after heat aging for 400 hours at 107° C.

One measurement which is used for predicting fragmentation of a cover skin for an air bag during deployment is the retention of elongation after heat aging after 500 hours at 120° C. As will be seen in the Examples of this application, the thermoplastic polyurethane alloy compositions of the present invention do retain sufficient elongation after heat aging under these conditions (preferably, 100% or higher, most preferably, 150% or higher) to indicate that these compositions are capable of withstanding successful air bag deployments.

The present invention also provides a method for preparing light stable automotive components from a polyether polyol-based aliphatic urethane thermoplastic elastomer melt-blended with an olefin-containing block copolymer, and a method for preparing such a composition into slush castable powder, pellets, microspheres or minibeads. The composition also may be used as the outer layer of a double cast skin.

Additionally, the present invention provides a skin, cover or shell, particularly for automotive trim panels, and more particularly for air bag door and instrument panel applications, which are produced from the melt-blended composition of a light stable polyether polyol-based aliphatic thermoplastic urethane elastomer and an olefin-containing block copolymer of the present invention.

Aliphatic thermoplastic urethane (TPU) elastomers which are suitable for use in the alloy compositions of the present invention are known to those skilled in the art. Examples of suitable TPU elastomers are disclosed in U.S. Pat. Nos. 5,824,738 and 6,187,859. Suitable aliphatic urethane elastomer compositions may be produced from low end group unsaturation, low molecular weight polyols which are reacted with an aliphatic diisocyanate and stabilized with one or more ultraviolet stabilizing agents, an antioxidant and pigments.

It has been found that compositions within the scope of the present invention may be produced by melt blending one or more of the olefin-containing block copolymers crosslinked to a gel content of from 5 to 95% with one or more aliphatic thermoplastic elastomers at weight ratios wherein the amount of olefin-containing block copolymer is equal to or less than the amount of aliphatic TPU. Alloy compositions made at these ratios have been found to be capable of meeting automotive air bag cover weathering and deployment requirements.

In another embodiment of the present invention, substitution of about 5-10% of the olefin-containing block copolymer with an ionomer has been found to provide improved weathering and less surface porosity, particularly when higher amounts of modifier are present.

The compositions of the present invention may be prepared by melt blending the aliphatic TPU elastomer with the olefin-containing block copolymer crosslinked to a gel content of from 5 to 95% (with or without ionomer) using a twin screw extruder. Pellets may then be formed and cryogenically ground to form a slush castable powder. The output of the extruder may also be formed into minibeads or microspheres according to the teachings of U.S. Pat. Nos. 5,525,274; 5,525,284; 5,564,102; 5,998,030; 6,410,141 and 6,632,525.

The TPU used in the present invention may be the reaction product of one or more low unsaturation (i.e., unsaturation level of less than 0.04 meq/g, preferably less than 0.02 meq/g) polyether polyol, one or more chain extenders and an aliphatic organic diisocyanate.

As used herein, an aliphatic diisocyanate is a diisocyanate that, contains only hydrocarbon functionality such as hexamethylene diisocyanate or (HMDI). The overall level of aliphatic functionality of a diisocyanate may therefore be greater than 75%(wt.) and fall within the range of 75-100% (wt).

A completely (100% wt.) aliphatic polyurethane is a polyurethane produced from one or more aliphatic diisocyanates, one or more aliphatic polyols (e.g., aliphatic polyether or polyester) and one or more aliphatic chain extenders. The aliphatic polyurethane so prepared may also be prepared in the presence of a urethane catalyst.

The weight percent ratio of TPU in the TPU alloy composition of the present invention may be from 5-95% by weight (based on total weight of TPU plus polyolefin modifier) and the weight percent of the polyolefin modifier may be from 5 to 95% by weight (based on total weight of TPU plus olefin), including all values and increments therein. In a preferred embodiment of the present invention, the TPU may be present in an amount of 50% by weight (based on total weight of TPU plus olefin modifier) and the polyolefin modifier may also be present at about 50% by weight (based on total weight of TPU plus olefin modifier). In a particularly preferred embodiment of the present invention, 45-90% by weight TPU and 5-45% by weight olefin modifier are present.

The compositions of the present invention may also contain fillers, pigments or other additives which may function to improve processing and/or product performance. Such additives may be present at levels which may be up to about 15% by weight in total.

For higher ratios of certain copolymers, e.g., when the olefinic modifier is used in an amount above about 30%, it has been found that in some cases, the addition of an ionomer, such as Surlyn® 9970 or Surlyn® 9975, may improve weatherability of the TPU alloy and reduce surface porosity. Surlyn® 9970 is an advanced ethylene/methacrylic acid copolymer in which the methacrylic acid groups have been partially neutralized with zinc ions which is commercially available from DuPont.

The melt blend of TPU/olefin-containing block copolymer crosslinked to a gel content of from 5 to 95% (with or without ionomer) may also include a color concentrate as a source of color. Suitable color concentrates are known to those skilled in the art. One example of a suitable color concentrate is that which is commercially available under the name Clariant 374A Pebble from Clariant Corporation. This product may include about 30% by weight pigment(s), about 5-10% of an antioxidant (e.g., Tinuvin 213 from Ciba-Geigy) and about 60-65% of an aliphatic TPU suitable for use in the composition of the present invention. The color concentrate may be present in an amount of from about 5 to about 10% by weight of the TPU alloy.

Typical compositions which may be melt blended to form the slush castable elastomers of the present invention include:
a) 45-90% by weight, based on total weight of melt blend, aliphatic TPU (produced with a polyol having an unsaturation level less than 0.04 meq/g);

b) 5-45% by weight, based on total weight of melt blend, of olefin-containing block copolymer modifier;

c) up to 30% by weight, based on total weight of melt blend, of ionomer (preferably, Surlyn® 9970 or 9975 ionomer);

d) 0-10% by weight, based on total weight of melt blend, of color concentrate (preferably, Clariant 374A color concentrate), in place of a portion of the olefin-containing block copolymer modifier.

The slush castable elastomers formed from the melt blending of the above ingredients will generally have a melt flow index (MFI) of about 38 (grams/10 minutes, 160° C./10 kilograms). The compatible blends of the present invention will generally have MFI's of between 20-150, including all values and increments herein.

The thermoplastic polyurethanes employed to produce the compatible blends of the present invention may be made by a "one-shot" reaction process. The "one-shot" technique involves mixing, in a suitable container, polyol, chain extender, organic diisocyanate, any ultraviolet stabilizing agent(s), any antioxidant, any pigment(s) or color concentrate, and urethane catalyst and, then, agitating the mixture for approximately 20 to 30 seconds. These thermoplastic polyurethanes can also be made by pre-blending a portion of the polyol, any antioxidant, catalyst and any UV/heat stabilizers. The polyol blend may be added to an agitated, heated tank of a urethane casting machine; isocyanate is placed into a separate agitated, heated tank; chain extender/crosslinker is placed into a third tank; and pigment masterbatch with the additional polyol is added at the mixhead. The components are metered individually using gear pumps or other pumps with the required metering accuracy, with suitable flow control devices, to a low pressure mixhead for blending. This mixture may be cast onto a temperature and speed controlled belt for completion of the reaction. Various temperatures could be maintained in different areas of the chamber.

The mixture from the mixing head of the urethane casting machine may also be used as the feed for a twin screw extruder. Various screw, sections can be set up to convey the liquid to continue polymerization, melt and blend the elastomer, and the final unpigmented elastomer could be fed to a strand die for pelletizing. The extruder output could also be used to make beads of the desired size for dry casting.

The extrusion operation could also be used to melt blend dry pigment for coloring/pigmenting the elastomer. The dry blended pigment would be fed into the extruder using a side feeder which would meter the proper amount into a clear melt mixture. The output of the side feeder would be synchronized with the output of the extruder.

The ingredients may also be fed directly into the throat of the twin screw extruder which would perform the blending, polymerization, melting, and pigmentation operations.

In preparing the improved light stable polyether/polyol based aliphatic urethane thermoplastic elastomer used to produce the compositions of the present invention, the polyether/polyol, diisocyanate, chain extender, and other components are typically reacted under conditions of elevated temperature. A preferred method of forming the desired thermoplastic elastomers is by continuous processing utilizing an extruder. An alternative method involves mixing in a "one shot" batch process, the polyol, chain extender, organic diisocyanate, ultra violet stabilizing agent, antioxidant, pigment, and urethane catalyst in a vessel to produce the elastomer of the present invention.

This aliphatic thermoplastic polyurethane elastomer is then combined with the polyolefin-based modifier in the appropriate amount by any of the techniques known to those skilled in the art.

The mixture of aliphatic thermoplastic polyurethane and polyolefin-based modifier is then placed into a suitable container where it is heated and, then, the mixture is chopped or ground into a powder using either a non-cryogenic or a cryogenic methods such as liquid nitrogen to facilitate and expedite the granularization or pelletizing of the slush molding composition.

One method for producing a powder or particle is described in U.S. Pat. No. 5,525,274. In this method, spherical particles having a diameter between 0.007 and 0.040 inches are formed by melt extruding the mixture of thermoplastic polyurethane and any other additives, particularly, a pigment and then directing the molten material through orifices with openings of the desired size into a liquid bath. The molten material passing into the liquid bath is cut into pieces to cause that molten material to be shaped into microspheres. This same process is suitable for the aliphatic thermoplastic polyurethane plus polyolefin-based modifier mixture from which the slush molding compositions of the present invention are formed. The powder or beads obtained are suitable for use as a castable powder. That is, the powder can be placed in a molding tool and heated to form an article of manufacture. Non-cryogenic grinding is made possible by changing the index of the aliphatic thermoplastic polyurethane elastomer. The index is the ratio of reactive equivalents of NCO containing components/reactive equivalents of OH and NH containing components. This change reduces the molecular weight of the elastomer and its inherent toughness allowing the polymer to be ground at ambient temperatures. The polymer may be prepared at an NCO/OH equivalent ratio of from 0.90 to 0.99 with a preferred range of 0.94 to 0.98.

The mixing of the polyurethane-forming reactants can be carried out at ambient temperature (approximately 25° C.) and the resulting mixture is then heated to a temperature of the order of about 40 to about 130° C., preferably to a temperature of about 90 to 120° C.

While any of the known aliphatic diisocyanates may be used to produce the thermoplastic polyurethanes of the present invention, diisocyanates which are particularly useful include: isophorone diisocyanate, hexamethylene diisocyanate, methylene bis(cyclohexyl isocyanate), its isomers and mixtures thereof, isomers and isomeric mixtures of cyclohexylene diisocyanate, 1-methyl-2,5-cyclohexylene diisocyanate, 1-methyl-2,4-cyclohexylene diisocyanate, 1-methyl-2,6-cyclohexylene diisocyanate, 4,4'-isopropylidene bis(cyclohexyl isocyanate) and mixtures and derivatives thereof. The organic diisocyanates can be present in amounts ranging from 20% to 50% but are preferably present in amounts in the range of approximately 25% to 40%.

Preferred polyol reactants for producing the aliphatic thermoplastic polyurethanes used in the present invention are polyether polyols and combinations thereof. Suitable polyols include at least one ether structural unit and have a number average molecular weight of from 1000 to 10,000 Da, preferably, at least 1250 and most preferably, at least 2,000 but less than 10,000 Da, preferably, less than 8,000 Da. The functionality of the polyol is preferably from 2 to 4. Suitable polyether polyols include polyoxyethylene glycols, polyoxypropylene glycols, copolymers of ethylene oxide and propylene oxide, polytetramethylene glycols, and copolymers of tetrahydrofuran and ethylene oxide and/or propylene oxide. It is, of course, possible to use such polyether polyols in combination with other known polyols (e.g., polyester polyols) but such other types of polyols should not be used in an amount greater than 50%. Preferably the polyether polyol is of the type produced using an organometallic catalyst which results in a polyol having a level of terminal unsaturation of less than 0.04 meq/g, and preferably less than 0.02 meq/g. A representative example of such a polyol is Acclaim 4220N (sold by Bayer MaterialScience LLC). Acclaim 4220N polyol is an ethylene oxide capped poly (propylene oxide) polyol with an approximate molecular weight of 4000 and a hydroxyl number of 28. The polyol component can be present in amounts ranging from approximately 40% to 70%. The preferred concentration of polyol present in the reaction ranges between 40% and 60% and is adjusted in this range to vary the hardness of the elastomer produced.

Chain extending agents which may be employed in the preparation of the urethane thermoplastic elastomer used in the present invention include diols and aromatic secondary or aliphatic primary or secondary diamines, all of which are well known in the art.

Preferred diol chain extenders include ethylene glycol, diethylene glycol, propylene glycol, pentane diol, 3-methylpentane-1,5-diol, 1,6-hexane diol, HQEE [hydroquinone bis(2-hydroxyethyl)ether], CHDM (1,4-cyclohexanedimethanol), HBPA (hydrogenated bisphenol A), 1,4-butane diol, neopentyl glycol, and dipropylene glycol can also be used.

In a particularly preferred embodiment, the chain extender is 1,4-butanediol. The chain extender, such as 1,4-butanediol, can be present in concentrations varying from 6% to 15%, but preferably ranges from 7% to approximately 13%.

The ultraviolet stabilizing agents include a combination of a hindered amine light stabilizers (HALS) such as bis(1,2, 2,6,6-pentamethyl-1-4-piperidinyl) sebacate (Chemical Abstract Number 41556-26-7, also known as Tinuvin 292 or 765 Ciba-Geigy Corp., Hawthorne, N.Y.) and a hydroxyphenyl benzotriazole such as a benzotriazole mixture of poly (oxy-1,2-ethanediyl), alpha-[3-[3-(2H-benzotriazol-2-yl)-5-(1,1-dimethylethyl)-4-hydroxyphenyl]-1-oxopropyl]-omega-hydroxy- and poly(oxy-1,2-ethanediyl), alpha-[3-[3-(2H-benzotriazol-2-yl)-5-(1,1-dimethylethyl)-4-hydroxyphenyl]-1-oxopropyl)-omega-[3-[(2H-benzotriazol-2-yl)-5-(1,1-dimethylethyl)-4-hydroxyphenyl]-1-oxopropoxy)-, Chemical Abstract Number 104810-47-1 and polyethylene glycol with a molecular weight of 300 Chemical Abstract Number 25322-68-3 (also known as Tinuvin 1130 or 213 Ciba-Geigy Corp., Hawthorne, N.Y.) and any other suitable, ultraviolet stabilizing agents. The combination of ultraviolet stabilizing agents being, present in a ratio in a range of approximately 1:1 to 2:1, with 2:1 being the preferred ratio, at a total concentration in the range of approximately 0.5 to 2.0%, with 2.0% being the preferred concentration.

Any suitable antioxidant, or mixture of antioxidants, may be, used in the elastomer forming process of the present invention. Representative examples include Irganox 1010 [tetrakis (methylene(3,5-di-tert-butyl-4-hydroxycinnamate)] methane from Ciba-Geigy; Irganox 1076 [Octodecyl 3,5 di-tert-butyl-4-hydroxyhydrocinnamate]from Ciba-Geigy; Irganox 245 [Ethylenebis (oxyethylene) bis-(3-tert-butyl-4-hydroxy-5-methylhydro-cinnamate)] from Ciba-Geigy; and Vanox 830 (a proprietary blend of a phenolic compound, alkylated diphenylamines and trialkyl phosphite from R. T. Vanderbilt). The antioxidants may be present at a total concentration in a range of approximately 0.10% to 1.0%, but are preferably present in the range of approximately 0.25% to 0.75%.

Any suitable pigmenting agent or mixture of pigmenting agents may be used to produce the compositions of the present invention. The agent or agents must have long-term ultraviolet light resistance for Arizona exposure; heat resistance up to 260° C. (500° F.) to survive the dry casting process, and the extrusion compounding process; and must not promote any degradation of the urethane elastomer. Representative pigments include carbon black (Columbian Chemicals Corporation); titanium dioxide (DuPont Company, Chemicals Department); Chomophthal Red BPP (Ciba-Geigy, Pigments Division); Phthalocyanine Blue Red Shade (Ciba-Geigy, Pigments Divisions); Yellow Iron Oxide (Miles Incorporated, Organic Products Division); and Quinacridone Violet (Hoechst Celanese Corporation, Specialty Products Group-Pigments). The pigmenting agent being present at a total concentration in the range of approximately 0.90% to 2.0% and preferably in a range wherein the total concentration is approximately 1.0% to 1.94%.

The urethane catalysts which are useful in the present invention may be any suitable urethane catalyst, or mixture of urethane catalyst, may be used in the elastomer forming process of the present invention. Representative samples include (a) tertiary amines such as ZF-20 [bis 2-(N,N-dimethylamino)ether]from Huntsman Chemical; N-methylmorpholine from Huntsman Chemical; N-ethylmorpholine from Huntsman Chemical; DMEA N,N-dimethyletha-nolamine from Union Carbide; Dabco 1,4-diazbicyclo[2,2, 2]octane from Air Products and the like; (b) salts of organic acids with a variety of metals such as alkali metals, alkaline earth metals, Al, Sn, Pb, Mn, Co., Ni, and Cu, including, for example, sodium acetate, potassium laurate, calcium hexanoate, stannous acetate, and stannous octoate, and the like; (c) organometallic derivatives of tetravalent tin, trivalent and pentavalent As, Sb, and Bi, and metal carbonyls of iron and cobalt. Useful organotin compounds include dialkyltin salts of carboxylic acids, e.g., dibutyltin diacetate, dibutyltin dilaurate, dibutyltin maleate, dilauryltin diacetate, dioctyltin diacetate and the like. Preferred catalysts are BiCat 8, BiCat 12, BiCat V and Coscat 83. The BiCat materials are products of Shepherd Chemical. Coscat 83 is a product of CasChem. Corporation. BiCats 8 and 12 are mixtures of bismuth and zinc carboxylates. BiCat V and Coscat 83 are bismuth neodecanoates. These catalysts are present at a total concentration in the range of approximately of 0.1% to 0.3% by weight, and preferably in the range of approximately 0.15% to 0.25%.

This aliphatic thermoplastic polyurethane elastomer is then combined with the polyolefin-containing block copolymer crosslinked to a gel content of from 5 to 95% in the appropriate amount by any of the techniques known to those skilled in the art.

The mixture of aliphatic thermoplastic polyurethane and polyolefin-based modifier may, for example, be placed into a suitable container and then chopped or ground into a powder using either a non-cryogenic or a cryogenic methods such as liquid nitrogen to facilitate and expedite the granularization or pelletizing of the slush molding composition.

One method for producing a powder or particle is described in U.S. Pat. No. 5,525,274. In this method, spherical particles having a diameter between 0.007 and 0.040 inches are formed by melt extruding the mixture of thermoplastic polyurethane and any other additives, particularly, a pigment and then directing the molten material through orifices with openings of the desired size into a liquid bath.

The molten material passing into the liquid bath is cut into pieces to cause that molten material to be shaped into microspheres. This process is suitable for processing the aliphatic thermoplastic polyurethane plus polyolefin-based modifier mixture from which the slush molding compositions of the present invention are formed. The resulting powder or beads are then suitable for use as a castable powder. This powder can be placed in a molding tool and heated to form an article of manufacture.

Automobile interior trim components having increased ultraviolet light stability and resistance to artificial weathering can be produced by continuous processing utilizing an extruder wherein the virgin elastomer is extruded and molded into automotive interior trim components as is well known in the art. In the alternative, the castable powder elastomer, described above, may be added to a mold and heated to produce an automotive trim component.

In accordance with another aspect of the invention, the slush molding composition of the present invention in the form of a powder or microspheres may be used to produce articles by roto-casting. In such process, a predetermined charge of materials is placed within a hollow mold that is supported on an arm of a centrifuge. The centrifuge has a motor that will drive the arm to cause the charge of material to flow evenly across the inner surface of the mold. The mold is heated to cause the slush molding composition to melt as it flows evenly across the inner surface of the mold to build-up a uniform thickness shell on the mold. The mold and shell are cooled and the mold is opened to remove the shell as a finished part or a near net shape part for final finishing.

In accordance with another aspect of the invention, the slush molding composition of the present invention in the form of a powder or microspheres (particularly, microspheres in the size range of 0.007" to 0.040") is suitable for use in slush molding. In such a process, an excess charge of the slush molding composition is placed in a charge or powder box. The box is connected to a mold having a cavity formed in part by a casting surface heated or cooled by a suitable heater or air cooling system. Once the box is connected to the mold, the box and mold are inverted so that the excess charge of materials is dumped into the mold cavity. Typical slush molding apparatus are described in U.S. Pat. Nos. 4,722,678; 4,878,827 and 4,056,941. The apparatus described in these patents maintain a static head of material over the layer of material that is dumped onto the casting surface of the mold cavity. The heating system provides heated air (other suitable heaters are suitable for use with the invention such as the hot oil heater of U.S. Pat. No. 4,389,177 or electrical heaters as shown in U.S. Pat. No. 4,979,888). The casting surface is heated to cause the thermoplastic melt extruded microspheres to melt as they are flowed-evenly across the casting surface and compacted thereon by the static head of the overlying material. It has been found that this enables a wider range of microsphere sizes to be, used for build-up of a uniform thickness shell on the casting surface having low porosity that is below a visual threshold for holes in the skin.

The mold cavity is cooled by suitable air cooling or liquid cooling systems as shown in U.S. Pat. Nos. 4,621,994; 4,623,503 and 5,106,285. The shell is concurrently cooled and the powder box and mold cavity are separated so that the mold is opened to remove the shell as a finished part or a near net shape part for final finishing.

The slush molding compositions of the present invention can be used to cast shells. Minibeads and spheroidal articles made by extruding the mixture of aliphatic thermoplastic polyurethane, polyolefin-based modifier and any other additives and pelletizing this mixture with an underwater pelletizing system, have been successfully cast into shells using the same equipment as used for powder. The low-melt viscosity of the composition of the present invention contributes greatly to the success in using this material to cast shells. The benefits seen are improved flow into areas with small radii and return edges, easier clean up and loading, and increased bulk density of the particle.

Pigmented slush molding compositions can be produced from the aliphatic thermoplastic urethane elastomer (TPU) plus polyolefin-based modifier using a single or twin screw extruder. Twin screw extruders can also be used to make thermoplastic urethane elastomers which are non-pigmented. These materials are then pigmented in a second operation by using color concentrates for injection molding or dry/wet pigments in a second extruder or other high-intensity mixers for other applications. After melting the elastomer, the dry (heat and UV stable automotive grade) pigments and other additives (antioxidants, release agents etc.) could be metered into the melt stream of the reactor to produce the desired color and then the melt could be fed to the pelletizing unit to produce pellets that can be further dried for use. This process reduces the handling operations currently used to pigment elastomers. The heat history that the materials would experience lowers cost and provides a more uniform product pellets for the casting process.

In practice, a thin shell, having a thickness between about 0.5 and 1.5 mm, may be formed by first providing a mold with a mold surface configured to complement the desired shape of the shell to be molded. The mold surface may then be heated (via suitable heaters such as a hot oil heater, or an electrical heater, or hot air or infrared heating). The heated casting surface may then cause the melt extruded microspheres (particles, pellets, etc.) of the inventive composition to melt as they are flowed evenly across the casting surface and compacted thereon by the static head of the overlying material. It has been found that this enables a wider range of particle sizes, to be used for build-up of a shell having a uniform thickness on the casting surface and low porosity that may be below a visual threshold for holes in the skin.

The compositions of the present invention may also comprise the outer layer of a dual layer cast shell in which the composition of the present invention is applied as an outer layer, and a second layer which may comprise a different material, e.g., an aromatic based polyurethane composition. The layers may be of about equal thickness. That is, the inner layer of the skin or shell of the dual layer cast shell may be primarily aromatic based. An aromatic polyurethane type inner layer should be understood herein to be a polyurethane produced from an aromatic diisocyanate and/or the use of an aromatic diisocyanate along with an aromatic extender. However, in either case, such aromatic polyurethane may utilize a polyol, including an aliphatic polyol (e.g., aliphatic polyether or aliphatic polyester). Accordingly, it can be appreciated that the use of an aromatic diisocyanate or even an aromatic extender may serve to increase a physical property such as heat resistance. The aromatic based inner layer may therefore be one that has a DE>3.0 after 1993 kiloJoules/m$^2$ of Xenon arc exposure. The aromatic polyurethane so prepared may also be prepared in the presence of a urethane catalyst.

The aromatic urethane composition, also preferably in the form of a dry particulate, such as powder or microspheres, may be cast on the inner surface of the outer layer formed of the first aliphatic urethane material. The aromatic urethane material may be allowed to melt and form an inner layer at least partially, and preferably completely, covering the inner surface of the outer layer. Sufficient heat may be transferred from the heated mold surface through the outer layer to melt the inner layer. The mold surface may then be cooled or allowed to cool which may allow the inner and outer layers to harden and bond together. Finally, the shell is removed from the mold.

It is further contemplated that the inner layer of the dual layer cast shell may comprise regrind or recycled plastic. In one exemplary embodiment, the inner layer may comprise a polymer material, a portion of which comprised a formed article prior to its use as the polymer material for the inner layer. By formed article, it is meant to include polymer material that has, e.g., experienced a prior plastics manufacturing operation, such as slush molding or injection molding, wherein the plastic material has been converted, by heat, or by heat and pressure, into some desired shape, but which may not have survived a quality control measure, and may have been rejected by the manufacturer for commercial release. This would also include materials recovered in manufacture such as trim scrap and faulty parts (regrind or recycle), and materials recovered from discarded post-consumer products (reclaim).

Having thus described the invention, the following Examples are given as being illustrative thereof.

EXAMPLES

The following materials were used in these Examples:
TPU: Reaction product of:
1) 100 parts by weight of a polyol component made up of:
   a) 81.6 parts by weight of the polyether polyol having a functionality of 2 and a molecular weight of 4000 with an unsaturation level of less than 0.04 meq/g (commercially available under the name Acclaim 4220N from Bayer MaterialScience),
   b) 12.8 parts by weight of butanediol,
   c) 2.02 parts by weight of hindered amine light stabilizer (HOSTAVIN 3055),
   d) 0.99 parts by weight of a substituted benzotriazole mixture which is commercially available under the name Tinuvin 213 from Ciba Geigy,
   e) 1.5 parts by weight of the proprietary release agent designated Techlube 721-SP-1 which is commercially available from Technick,
   f) 0.75 parts by weight of the silicone surfactant which is commercially available under the name Silwet L-2622 from OSI, and
   g) 0.58 parts by weight of bismuth neodecanoate with
2) 41.62 parts by weight of the liquid cycloaliphatic diisocyanate having an NCO content of 31.8% minimum which is commercially available under the name Desmodur W from Bayer MaterialScience.
MODIFIER A: A polyolefin-based modifier which is commercially available under the designation APR 7410 from Ferro Corporation.
MODIFIER B: A polyolefin-based modifier which is commercially available under the designation APX 7621 from Ferro, Corporation.
COLORANT: Clariant 374A Pebble.
IONOMER: An ethylene methacrylic acid copolymer in which part of the methacrylic acid is neutralized with a metal ion which is commercially available under the name Surlyn 9770 from E.I. DuPont de Nemours.

Examples 1-4

TPU, at least one of the above-described MODIFIERS, IONOMER and COLORANT were melt blended in the amounts indicated in Table 1 in a twin screw extruder, such as a 27 mm. Leistritz. The extruder was set up to have zone temperatures between 155 and 165° C. with the screw operating at 300 rpm feeding a 3 hole pelletizer die. Microspheres in the size range of about 0.007" to about 0.040" were formed from the extruder described above in the manner described in U.S. Pat. Nos. 5,525,274 and 5,525,284. These microspheres were suitable for use in slush molding. These microspheres of the inventive composition may be cast to form skins or shells.

In these Examples, the TPU/olefin-containing block copolymer melt-blended extrudate was cryogenically ground to form a powder for slush casting.

Exemplary formulations of the present invention which may be suitable as the slush cast skin capable of meeting automotive weathering and deployment requirements, in addition to an automotive material testing specification, such as Ford WSS-M15P45-A, are shown below in Table 1.

TABLE 1

| Example | 1 | 2 | 3 | 4 |
|---|---|---|---|---|
| TPU (pbw) | 73 | 61 | 43 | 63 |
| MODIFIER A (pbw) | 20 | 30 | 20 | 20 |
| MODIFIER B (pbw) | 0 | 0 | 30 | 10 |
| IONOMER (pbw) | 0 | 2 | 0 | 0 |
| COLORANT (pbw) | 7 | 7 | 7 | 7 |
| Tensile Strength | 870 | — | 317 | 610 |
| Initial Elongation (%) | 340 | 206 | 94 | 161 |
| Elongation after Heat Aging (%) | 204 | 133 | 1.14 | 147 |
| Delta E after 1993 kJ/m$^2$ | 0.664 | 5.625 | 2.787 | 1.345 | pbw = parts by weight

Weathering resistance according to SAE J1885 (1993 kiloJoule/m$^2$ Xenon Arc exposure) of 3.0 or less are generally acceptable for U.S. automotive air bag doors and instrument panels. The formulations of Examples 1, 3 and 4 would therefore be expected to be suitable for use in automotive air bags and instrument panels.

While not being bound by any particular theory, it is believed that the present disclosure illustrates an unexpected degree of compatibility between constituents that, in the past, have been considered generally incompatible, due to somewhat miscible domains formed in the specific thermoplastic urethane composition used. This unexpected compatibility is believed to be the result of using an aliphatic diisocyanate in combination with an extender (e.g., 1,4-butanediol) which may then be coupled to polyols with a low amount of unsaturation (i.e., unsaturation levels below 0.04 meq/g). Thus low unsaturation-type polyol may provide a domain capable of compatible blending with the olefin-containing block copolymers described herein, when melt blended with the thermoplastic urethane.

The inventive compositions disclosed herein may be formed into the skins or shells of the present invention by any of the known processes for making such articles, including cast molding, slush molding, injection molding, blow molding, transfer molding, rotational molding, and injection-compression molding.

The invention has been described in an illustrative manner; and it is to be understood that the terminology which has been used is intended to be in the nature of words of description rather than of limitation. Obviously, many modifications and variations of the present invention are possible in light of the above teachings. It is, therefore, to be understood that the invention may be practiced otherwise than as specifically described.

Although the invention has been described in detail in the foregoing for the purpose of illustration, it is to be understood that such detail is solely for that purpose and that variations can be made therein by those skilled in the art without departing from the spirit and scope of the invention, except as it may be limited by the claims.

What is claimed is:

1. A molding composition consisting of a compatible blend of
   a) from 5 to 95 wt. % of an aliphatic thermoplastic polyurethane comprising the reaction product of
      (i) a polyol component comprising at least one polyether polyol having a molecular weight of from 1000 to 10,000 Da and an unsaturation level less than or equal to 0.04 meq/g,
      (ii) an isocyanate component comprising at least one aliphatic organic diisocyanate,
      (iii) a chain extender,
      (iv) optionally, a UV stabilizing agent,
      (v) optionally, an antioxidant,
      (vi) optionally, a pigment, and
      (vii) a catalyst which promotes urethane formation,
   b) from 5 to 95 wt. % of an olefin-containing block copolymer crosslinked to a gel content of from about 5 to about 95%,
   c) optionally, a UV stabilizing agent,
   d) optionally, an antioxidant,
   e) optionally, a pigment,
   f) optionally, a mold release agent, and
   g) optionally, an ionomer.

2. The composition of claim 1 wherein component b) has a shear viscosity of approximately 900 at a shear rate of 250 $sec^{-1}$ which drops to approximately 150 at 2100 $sec^{-1}$.

3. The composition of claim 1 wherein component b) is a block copolymer based on styrene and ethylene and/or butylene.

4. The composition of claim 1 wherein component a)(i) has an unsaturation level of less than 0.02 meq/g.

5. The composition of claim 1 wherein the aliphatic organic diisocyanate is selected from the group consisting of hexamethylene diisocyanate, hydrogenated diphenylmethane diisocyanate, and isophorone diisocyanate.

6. The composition of claim 1 wherein the chain extender is selected from the group consisting of ethylene glycol, diethylene glycol, propylene glycol, 1,4-butane diol, pentane diol, 3-methylpentane-1,5-diol, 1,6-hexane diol, hydroquinone bis(2-hydroxyethyl)ether, 1,4-cyclo-hexanedimethanol, neopentyl glycol, and hydrogenated bisphenol A.

7. The composition of claim 1 wherein the ionomer is an ethylene methacrylic acid copolymer.

8. The composition of claim 1 wherein the ionomer is an ethylene methacrylic acid copolymer in which a portion of the methacrylic acid is neutralized with a metal ion.

9. The composition of claim 1 wherein component a) is produced from a mixture comprising from 40 to 70 wt. %, based on total weight of the thermoplastic polyurethane, of the polyol component.

10. The composition of claim 1 wherein components a) and b) are melt blended.

11. The composition of claim 1, wherein component a) comprises 45-90 wt. %, component b) comprises 5-45 wt. %, and component e) comprises 5-10 wt. %, of the molding composition.

12. The composition of claim 1, wherein component a) comprises 45-90 wt. %, component b) comprises 5-45 wt. %, component e) comprises 5-10 wt. %, and component g) comprises 0-10 wt. % of the molding composition.

13. The composition of claim 1 wherein the ratio of a) to b) by weight is greater than or equal to 1:1.

14. A process for producing a slush castable powder comprising melt blending the composition of claim 1 in an extruder and cryogenically grinding the resulting melt blended extrudate.

15. A process for producing slush castable microspheres comprising melt blending the composition of claim 1 in an extruder, passing the melt blended composition through a die, and cutting the composition exiting the die.

16. A process for producing a slush castable powder comprising melt blending the composition of claim 1 in an extruder and underwater grinding the resulting melt blended extrudate.

17. A process for the production of a single layer cast shell comprising
   a) applying the composition of claim 1 to a mold surface,
   b) heating the mold surface to cause the applied composition to melt,
   c) allowing the melt to flow over the mold surface, and
   d) allowing the melt to cool.

18. A molded article produced by the process of claim 17 wherein no further components are added to the single layer cast shell.

19. A process for the production of a dual layer cast shell comprising
   a) applying the composition of claim 1 to a mold as an outer layer, and
   b) applying an inner layer comprising another composition to the outer layer, and
   c) molding the inner and outer layers in a manner such that the inner and outer layers harden and bond together.

20. The process of claim 19 in which the inner layer composition is a polyurethane produced from an aromatic polyisocyanate.

21. The process of claim 19 in which the inner layer composition has a melt flow comparable to the composition of the outer layer.

22. A molded article produced by the process of claim 19 in which the outer layer consists of the composition.

23. A molded article in the form of a skin, cover, or shell produced by the process of claim 19 in which the outer layer consists of the composition.

24. A thermoformed sheet consisting of the composition of claim 1.

25. A process for the production of an article comprising injection molding the composition of claim 1.

26. An injection molded article produced by the process of claim 25 which consists of the composition.

* * * * *